May 15, 1951     K. R. KENNEDY     2,552,976
STOCKING STRETCHER
Filed April 17, 1950
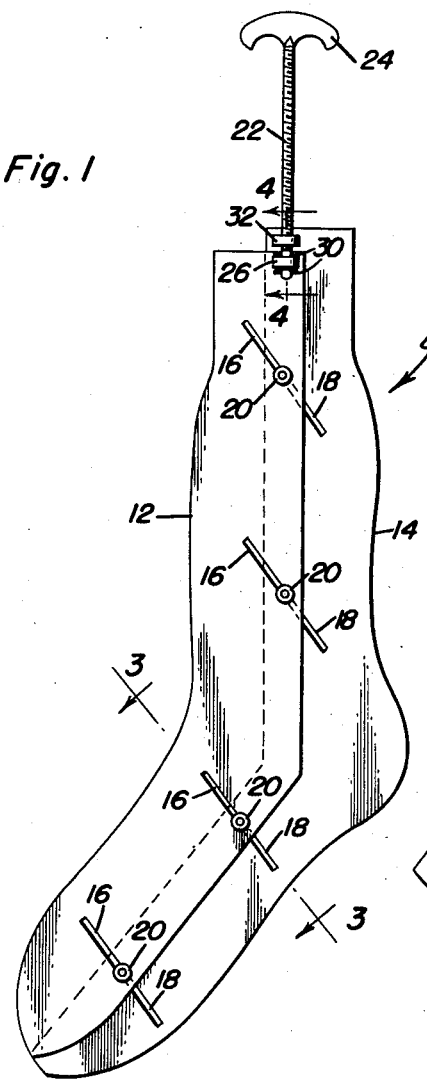
Fig. 1
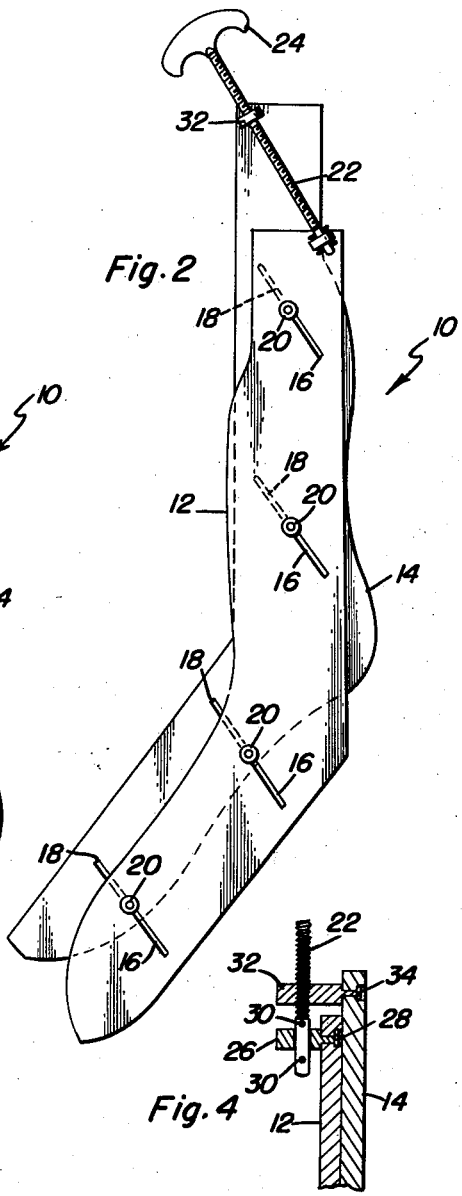
Fig. 2
Fig. 4
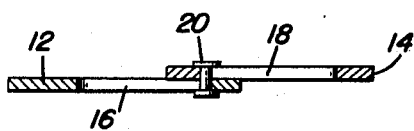
Fig. 3
Kenneth R. Kennedy
INVENTOR.

Patented May 15, 1951

2,552,976

UNITED STATES PATENT OFFICE 2,552,976

STOCKING STRETCHER

Kenneth R. Kennedy, Bakersfield, Calif., assignor of forty per cent to Alden M. Johnson, Santa Barbara, Calif.

Application April 17, 1950, Serial No. 156,276

3 Claims. (Cl. 223—75)

This invention relates to new and useful improvements and structural refinements in stocking stretchers, and the principal object of the invention is to provide a device of the character herein described which may be quickly and easily contracted, so to speak, to permit the insertion thereof into a wet stocking, and which may be expanded with equal expediency so as to properly stretch the stocking.

Some of the advantages of the invention reside in its simplicity of construction, in its efficient operation, in its adaptability to accommodate stockings of different sizes, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a side view of the invention in its expanded position,

Figure 2 is a side view thereof in its contracted position,

Figure 3 is a sectional detail, taken substantially in the plane of the line 3—3 in Figure 1, and Figure 4 is a sectional detail, taken substantially in the plane of the line 4—4 in Figure 1.

Like characters of reference are employed to designate like parts in the specification and throughout the several views.

Referring now to the accompanying drawings in detail, the invention consists of a stocking stretcher which is designated generally by the reference character 10 and embodies in its construction a pair of elongated members 12, 14 which are disposed in laterally overlapped relation as is best shown in Figure 3 and are shaped to conform, more or less, to the configuration of a stocking, as illustrated in Figure 1.

The members 12, 14 are provided with pairs of registering slots 16, 18 respectively, which extend obliquely of the length of the members, substantially as shown. A fastening element 20, preferably in the form of a rivet, is positioned in each pair of the registering slots 16, 18, whereby the two members may be slid laterally of each other, that is, in a direction parallel to the slots 16, 18, so that the combined width of the two members 12, 14 may be varied. In other words, the two members may be slid from an expanded position shown in Figure 1 to a contracted position shown in Figure 2 to permit a wet stocking to be applied thereto for subsequent stretching.

The relative sliding of the two members is effected by an actuating screw 22 which is provided with a convenient handle 24 and is rotatably journalled in a bearing block 26 which, in turn, is pivotally attached to the member 12 as at 28. Longitudinal shifting of the screw 22 in the bearing block 26 is prevented by providing a pair of cotter pins 30 in the screw at opposite sides of the bearing block, and it is to be noted that the screw 22 operatively engages a screw threaded block 32 which is pivoted as at 34 to the member 14.

Accordingly, by simply rotating the screw 22 the members 12, 14 may be slid, one relative to the other, and the pivotal attachment 24, 34 of the respective blocks 26, 32 will enable the screw 22 to angularly adjust itself relative to the members 12, 14 as the relative position of the two members changes.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a stocking stretcher, the combination of a pair of elongated members disposed in laterally overlapped relation and slidable laterally of each other whereby the combined width thereof may be varied, means slidably connecting said members together, an actuating screw rotatably mounted on one of said members, and a screw threaded block provided on the other member and operatively engaging said screw, whereby said members may be slid laterally relative to each other.

2. In a stocking stretcher, the combination of a pair of elongated members disposed in laterally overlapped relation and provided with registering slots extending obliquely of the length of the members, fastening elements extending through said registering slots to connect said members together and permit lateral sliding of one member to the other whereby the combined width of the members may be varied, and means for sliding said members relative to each other.

3. The device as defined in claim 2 wherein said means include a bearing block pivotally attached to one of said members, a screw threaded block pivotally attached to the other member, and a rotatable actuating screw journalled in said bearing block and operatively engaging said screw threaded block.

KENNETH R. KENNEDY.

REFERENCES CITED

The following references are of record in the file of this patent:

UNITED STATES PATENTS

| Number | Name | Date |
| --- | --- | --- |
| 2,175,661 | Gordon | Oct. 10, 1939 |